United States Patent

Zeph

[15] 3,673,501

[45] June 27, 1972

[54] CONTROL LOGIC FOR LINEAR SEQUENCE GENERATORS AND RING COUNTERS

[72] Inventor: David L. Zeph, Indianapolis, Ind.

[73] Assignee: The United States of America as represented by the Secretary of the Navy

[22] Filed: Aug. 18, 1971

[21] Appl. No.: 172,809

[52] U.S. Cl. ..........................328/37, 307/221 R, 307/223 R, 328/43

[51] Int. Cl. ................G11c 19/00, H03k 21/00, H03k 21/34

[58] Field of Search ...............328/37, 43, 48, 63; 307/221 R, 307/223 R; 340/146.1

[56] References Cited

UNITED STATES PATENTS

| | | | |
|---|---|---|---|
| 2,951,230 | 8/1960 | Cadden | 328/37 X |
| 3,258,696 | 6/1966 | Heymann | 328/37 |
| 3,439,279 | 4/1969 | Guanella | 328/37 X |

*Primary Examiner*—John Zazworsky

*Attorney*—R. S. Sciascia, et al.

[57] ABSTRACT

A control logic for linear sequence generators and ring counters to prevent "latch-up" in the "0" state having a linear sequence generator including a shift register with modulo-2 exclusive-OR feedback from the shift register to the shift register input and feedback through binary counters to detect and count $n-1$ consecutive "0"s in the shift register to feed a "1" into the shift register to prevent "0" state latch, where $n$ is the number of shift register stages used.

9 Claims, 6 Drawing Figures

CONTROL LOGIC FOR LINEAR SEQUENCE GENERATORS AND RING COUNTERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sequence counters and ring counters and more particularly to a solid state control logic circuit to prevent "latch-up" in the all "0" state in these circuits.

One of the common problems associated with linear sequence generators is the avoidance of the condition where all of the shift register elements are "0," the zero state, a condition that might occur at turn "on" or be caused by spurious noise during operation. If the zero state occurs, the shift register elements will "latch" in this state. To avoid this problem an AND gate has inputs coupling the $\overline{Q}$ outputs of all the shift register stages, except the $n$th bit and its output coupled to the shift register input to produce a "1" input when the $\overline{Q}$ outputs of the first through $n-1$ bits are "0" to restart the correct sequence generation. Additional components are necessary if the sequence generator is to be directed to the zero state. For large values of $n$, several AND gates and/or extenders plus considerable interconnection wiring is necessary.

As with the linear sequency generator, the ring counter also suffers from "latch-up" in the zero state. And again an $n-1$ input AND gate is required to avoid this state. The considerable amount of wiring to all shift register elements, the extenders and AND gates required are quite a disadvantage and burdensome in the prior known sequence generators and ring counters.

SUMMARY OF THE INVENTION

In the present invention a modulo-2 exclusive-OR feedback circuit from the shift register of length $n$ is fed back to the shift register input. The sequence of binary values ("1" or "0") generated by this device appears random, but is called pseudo-random since the sequence is precisely generated and repeatable having a period of $2^n-1$. Consequently a shift register of length $n$ is caused to go through all but one of its $2^n$ states. The missing state is the one where all $n$ flip-flops are a "0," the zero state. A device, such as a binary counter, placed at the input of the shift register is programmed to count consecutive "0" inputs, but resets whenever a "1" input occurs. If $n-1$ consecutive "0" inputs occur, the binary counter will overflow producing a synchronization signal and a "1" feedback to the input of the shift register. In the linear sequence generator this would occur at the same time that the normal feedback output is a "1," but would also occur if the shift register is locked up in the zero state since the binary counter would receive $n-1$ consecutive "0" outputs. The overflow itself serves as the feedback to the input of a ring counter. By this means a linear sequence generator or a ring counter is prevented from "latching-up" in the "0" state with a minimum of wiring and components in control logic circuitry. Accordingly, it is a general object of this invention to provide a logic circuit for linear sequence generators and ring counters to prevent "latch-up" in the zero state with a minimum of parts and wiring.

BRIEF DESCRIPTION OF THE DRAWINGS

These and other objects and the attendant advantages, features, and uses of the invention will be more apparent to those skilled in the art as a more detailed description proceeds when considered along with the accompanying drawings in which.

DESCRIPTION OF THE PREFERRED EMBODIMENT

FIG. 3

Figure 1:
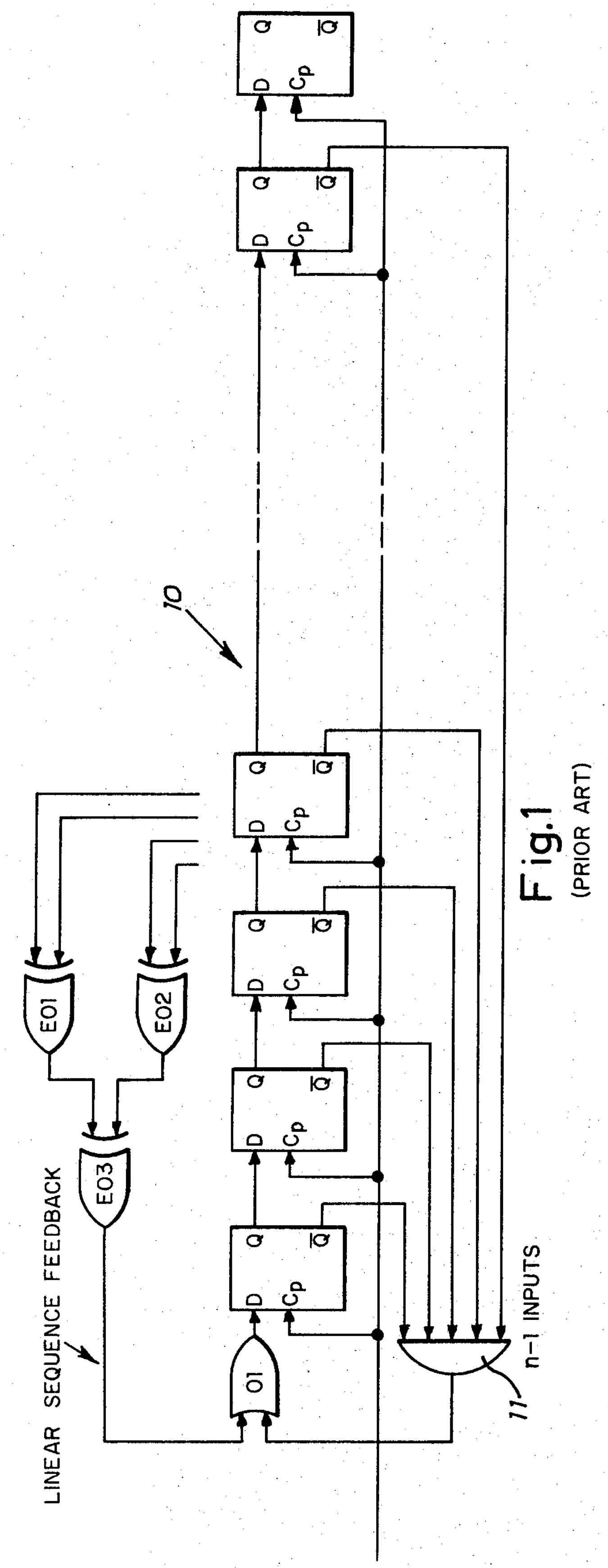
Fig.1 (PRIOR ART)
FIGS. 1 and 2 illustrate known prior art constructions of linear sequence counters and ring counters, respectively.
Figure 2:
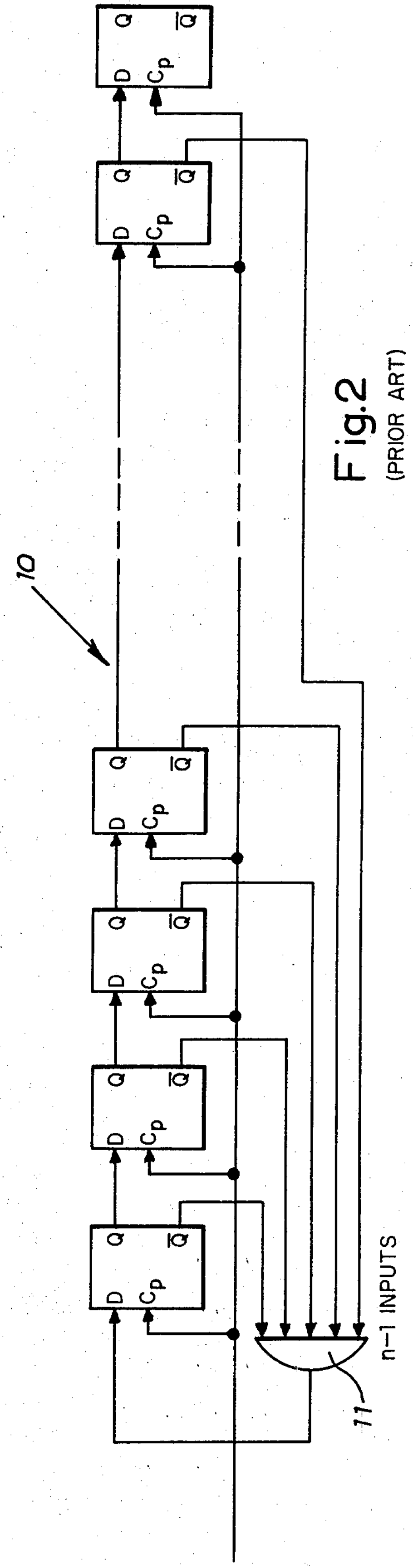
Fig.2 (PRIOR ART)

Referring more particularly to FIGS. 1 and 2 illustrating the known prior art of linear sequence generators and ring counters, respectively, there is shown the mechanism to prevent "latch-up" of the counters in the "0" state. In FIG. 1 the linear sequence counter consists basically of a shift register illustrated by the reference character 10 of any desirable number less than or equal to 20 stages with a linear sequence feedback through the use of modulo-2 exclusive OR circuits EO1, EO2, and EO3 through an OR gate O1 to the input of the shift register. The inputs to the modulo-2 exclusive OR gates EO1 and EO2 are from various shift register stages in accordance with feedback tables from $n$=1 to $n$=20 of the shift register as found in the text Radar Handbook by Merrill Skolnik, published by McGraw-Hill Book Company (1970). By selection of the various shift register inputs to EO1 and EO2 different desired linear sequences of binary digits can be accomplished, as well understood by those skilled in the art. In order to avoid " latch-up" in the "0" state of the shift register 10 the not-Q outputs ($\overline{Q}$) are coupled from $n-1$ of the shift register stages as inputs to an AND gate 11, the output of which is the second input to the OR gate O1. The sequence of the binary values of "1" or "0" generated by this device linearly as established by the coupling of the shift register stages to the exclusive-OR gates EO1 and EO2, while appearing to be random, is called pseudo-random since the sequence is precisely generated and repeatable having a period of $2^n-1$. Consequently, a shift register of length $n$ is caused to go through all but one of its $2^n$ states. The missing state is the one where all $n$ flip-flops of the shift register are a "0," the zero state. The AND gate 11 is used to provide detection of this "latch-up" or zero state should it accidentally occur. Since this gate has $n-1$ inputs, it is obvious that the gate will detect both the zero state and another state normally occurring with the desired sequence. This latter feature is used to provide synchronization to the recycling point of the sequence and avoid "latch-up" of the shift register 10 in the "0" state.

Referring more particularly to FIG. 2, as with the linear sequence generator, the ring counter also suffers from "latch-up" in the zero state. Again an $n-1$ input AND gate 11 is required to avoid this state. In the case of the ring counter the AND gate 11 will cause a "1" to be loaded into the first stage of the shift register whenever $n-1$ "0" output states occur in the register 10.

Figure 3:
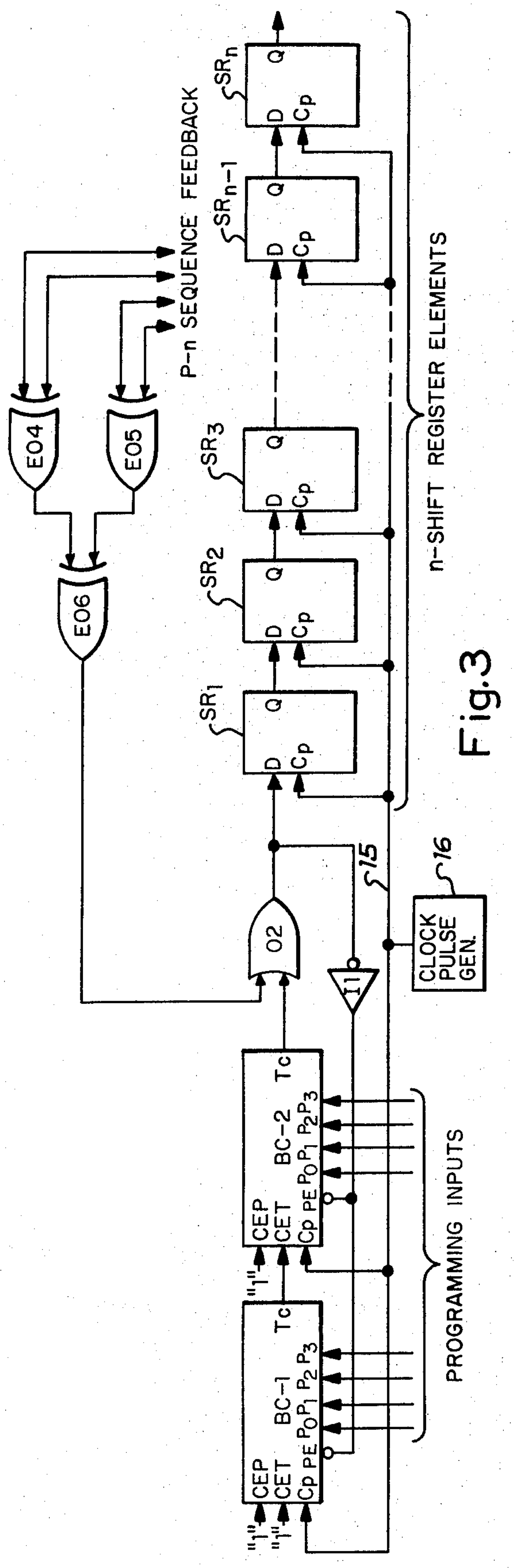
FIG. 3 is a block circuit diagram of a linear sequence counter illustrating the basic invention.

Referring more particularly to FIG. 3 the basic invention is illustrated in which $n$ shift register elements SR1, SR2, SR3 – SR$n$ are coupled to provide a linear sequence generator. As in FIG. 1 a modulo-2 exclusive OR circuit, herein illustrated as being EO4, EO5, and EO6, has P-N sequence inputs to EO4 and EO5 from various shift register stages as explained for FIG. 1 to produce the desired linear sequence of generated binary numbers. The exclusive-OR circuit output from EO6 is applied through OR gate O2 to the D input of the first stage SR1 of the shift register. A second input to OR gate O2 is the terminal count (TC) output from the second of two binary counters BC1 and BC2 having the first TC output coupled to the count enable terminal (CET) of BC2. The count enable parallel terminals (CEP) are each coupled to a binary "1" source to enable the counters. Pulse enable (PE) terminals are coupled from the output of OR gate O2 through an inverter I1. The binary counters BC1 and BC2 are of the conventional flatpac four-stage type available on the commercial market each with four input terminals P0, P1, P2, and P3 which terminals of each counter are coupled to programming inputs of binary numbers which may be established normally or automatically to control how many consecutive "0"s must be detected in the shift register before a "1" output of BC2 is applied from TC to O2 OR gate. As well understood in the art, each of the stages of the shift register and the two binary counters BC1 and BC2 have clock pulse input terminals coupled by conductor 15 in parallel from a clock pulse generator 16 to synchronize all operations. While the binary counters BC1 and BC2 are the only two shown herein to provide the count up to eight binary numbers, it is to be understood that a more or less number of these counters may be utilized to fit the desirable programming of the shift register SR1 through SR$n$.

OPERATION OF FIG. 3

In the operation of FIG. 3 the shift register will produce a linear sequence binary count in accordance with the P-N sequence feedback coupled through the exclusive-OR gates EO4 through EO6 and through OR gate O2 to the input of SR1 which will be repeated. The programming inputs to BC1 and BC2 are wired to a binary number that is $n-1$ less than the maximum count of 1 1 1 1 1 1 1 1 such that if $n-1$ consecutive "0" inputs to the shift register occur, the binary counters will reach this all "1" state at which point the TC output of BC2 will be a "1." Each time a "1" input to the shift register occurs, it is fed back as a "0" to the PE inputs of BC1 and BC2 via inverter I1 causing the counters to load the binary number present at the programming inputs on the next clock pulse. Consequently, the counters BC1 and BC2 are "restarted" in their search for $n-1$ consecutive "0"s. In the event that the shift registers are "latched" in the zero state, the succession of $n-1$ "0" inputs will cause the counter to reach its maximum count and a "1" will be present at the TC output of BC2. On the next clock pulse a "1" will be loaded into the D input of register SR1 causing it to resume normal operation, while the binary counters will be restarted.

In the case of the ring counter application BC1 and BC2 will cause a "1" to be loaded into the shift register only once every $n$ clock pulses providing normal feedback, self-starting, and self-correcting capabilities. The length of the ring counter is determined merely by the binary number present at the counter programming inputs of P0 through P3. Digitally available ring counters are easily implemented with this invention.

FIG. 4

Figure 4:
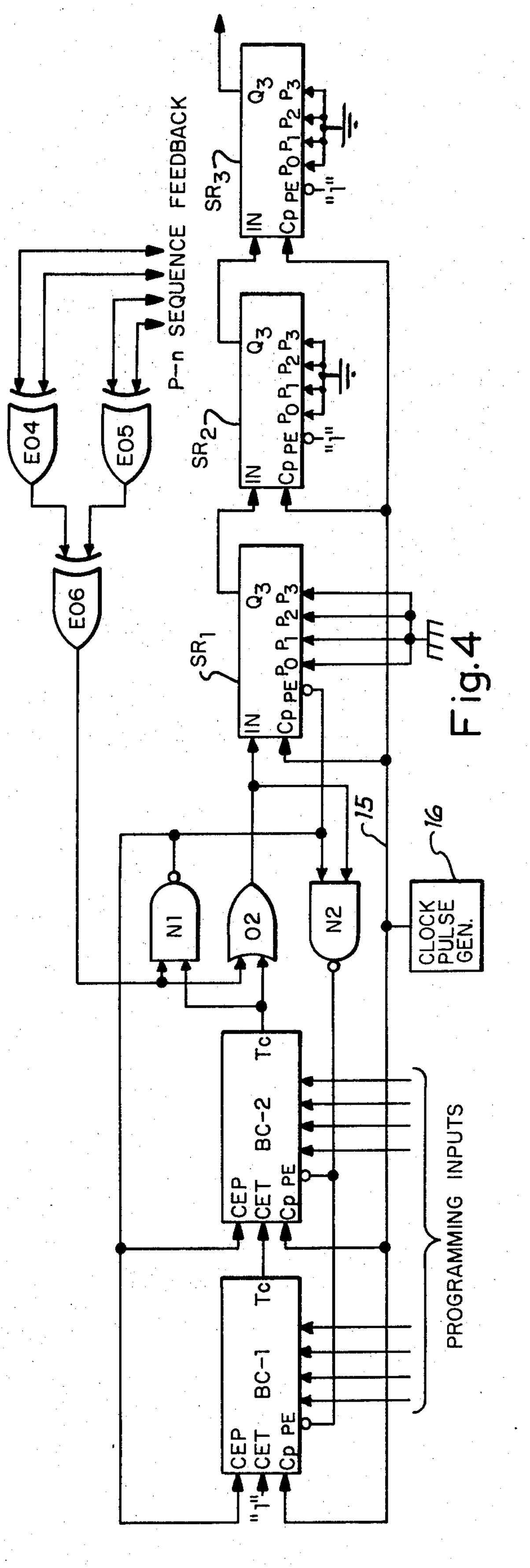
FIG. 4 illustrates another embodiment of the sequence counter of FIG. 3 which will provide a non-linear sequence of count.

Referring more particularly to FIG. 4 there is illustrated an interconnection necessary to divide by $2^n$ instead of $2^n-1$, but such a generator will no longer be a linear sequence generator. In this modification two NAND gates N1 and N2 are coupled with one of the inputs to N1 being from the output of EO6 in parallel with the input to O2, the output of N1 being in parallel to the CEP inputs of BC1 and BC2 as well as to the PE terminal of SR1 and one input to N2. The second input to NAND gate N2 is from the output of OR gate O2, the output of this NAND gate N2 being in parallel to the PE inputs of binary counters BC1 and BC2. All other couplings are the same as in FIG. 3, like reference characters showing like parts. All other PE inputs of SR2 through SR$n$ are coupled to a binary "1" voltage input. The parallel inputs P0, P1, P2, and P3 for each stage of the shift register are coupled in parallel to a fixed potential, such as ground. The shift register stages SR1, etc., are flatpacs available on commercial market usually arranged to shift four binary digits with the Q output being applied to the input of the next succeeding state, as well understood by those skilled in the art.

OPERATION OF FIG. 4

In the circuit of FIG. 4 operation is normal until the shift register reaches the point when $n-1$ consecutive "0" inputs have occurred and the $n$th shift register element is a "1." At this point the feedback via EO6 will be a "1" and since $n-1$ consecutive "0" inputs have occurred, the TC output of BC2 will also be a "1." Consequently, the output of the NAND gate N1 will be a "0." This output is fed to the CEP inputs of the binary counters to prevent them from counting on the next clock pulse. This "0" output from N1 is also applied to the NAND gate N2 so that the PE inputs to the binary counters BC1 and BC2 will be a "1" preventing them from accepting parallel entry data. This "0" output from N1 is also fed to the PE input of the first four-bit shift register SR1 so that it will accept parallel entry data on the next clock pulse. Therefore, on the next clock pulse the binary counters BC1 and BC2 will remain unchanged, "0"s will be loaded into the first four bits of the shift register and the "1" in the $n$th bit of the shift register will shift out and be replaced by the "0" from the $n-1$ bit shift register. The shift register SR1 through SR$n$ will now be in the zero state. At this point the feedback via EO6 will be a "0" causing the output of N1 to be a "1" enabling N2 and shifting the first four-bit shift register back to a serial mode of operation. Since the binary counters BC1 and BC2 remain unchanged, the TC output of BC2 will still be a "1" so that on the next clock pulse a "1" will be loaded into the first shift register through the OR gate O2. Because this "0" is applied to the PE terminals of BC1 and BC2, the programming inputs will be entered into the binary counter in parallel on the same clock pulse. The starting point will once again be loaded into BC1 and BC2. In this way the sequence generator has been directed through the "0" state.

FIG. 5

Figure 5:
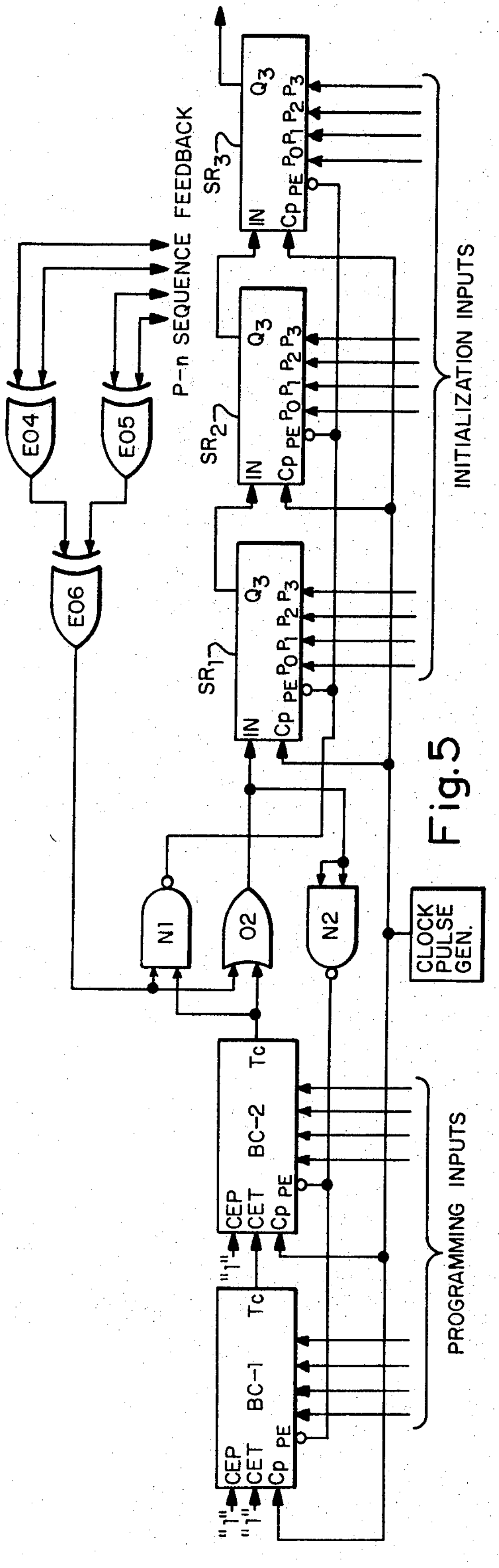
FIG. 5 illustrates a further embodiment of the invention to allow division of any number from $n$ to $2^{n-1}$.

In FIG. 5 a simple extension of this technique is illustrated which allows division by any number from $n$ to $2^n-1$. In this figure the output of the NAND gate N1 is coupled in parallel to the parallel entry inputs PE on all shift register stages SR1 through SR$n$ and the output of N1 to the CEP inputs of BC1 and BC2 is eliminated. In this modification the CEP inputs to BC1 and BC2 are coupled to a binary "1" voltage in the same manner as the CET terminals. Also in this modification the output of N1 is coupled only to the PE inputs of the shift register SR1 — SR$n$ and both inputs of N2 are coupled to the output of OR gate O2. A further modification to this figure over that of FIG. 4 couples the parallel entry inputs P0, P1, P2, P3, etc., of each of the shift register stages to initialization inputs, the meaning of which will later be described.

OPERATION OF FIG. 5

In the operation of this figure, as illustrated, when $n-1$ consecutive "0" inputs have occurred and the $n$th shift register element is a "1," the feedback via EO6 is a "1" and the TC output of BC2 is a "1" causing the output of the NAND gate N1 to be a "0." This output causes the shift register SR1 through SR$n$ to switch to a parallel entry mode of operation, and on the next clock pulse they will load the initialization inputs in parallel to the entry inputs P0, P1, P2, P3, etc., of the register. Since the output of OR gate O2 is a "1," the binary counters BC1 and BC2 will at the same time be reloaded with their starting point (1 1 1 1 1 1 1 1 $-(n-1)_2$). Normal operation will therefore resume somewhere within the linear sequence foreshortening the sequence length. The initialization inputs for $N=2$ through 5 are known but additional computer runs are necessary before they are known for $n=6$ through 20.

FIG. 6

Figure 6:
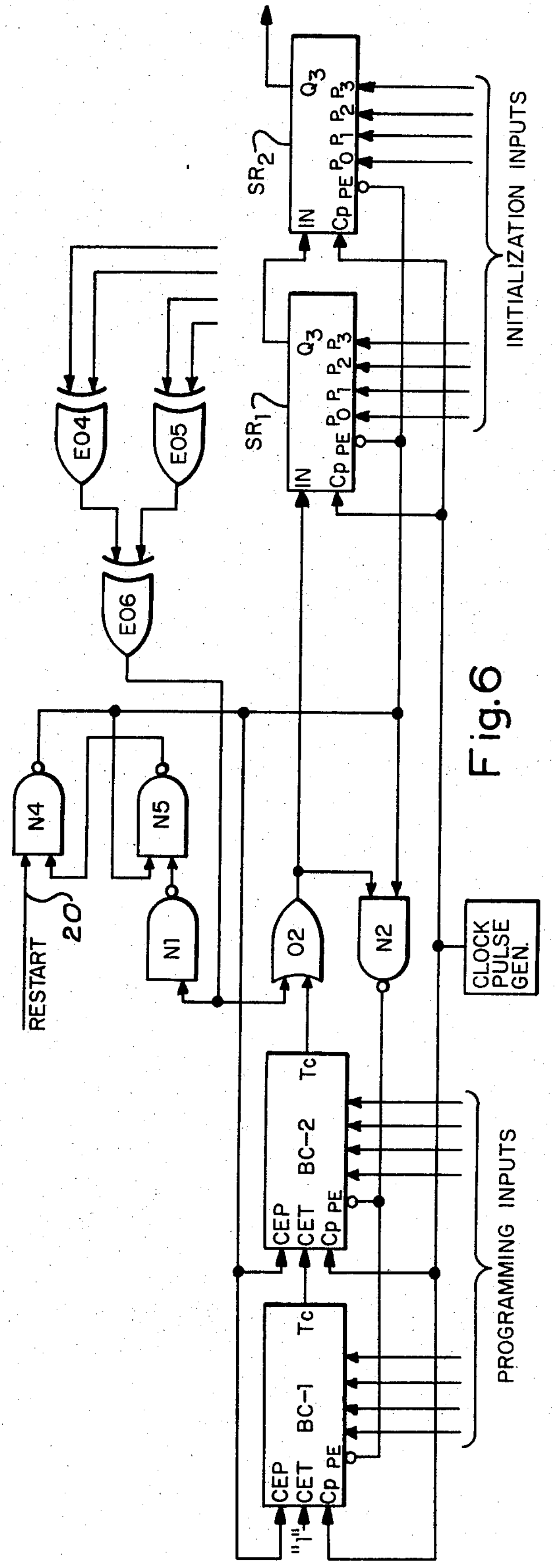
FIG. 6 illustrates a still further embodiment of the invention providing a cycle counter.

Referring more particularly to FIG. 6 the prior circuits are further modified by inserting a "latch" in the coupling circuit between the exclusive-OR modulo-2 gates and the input to the shift register, like reference characters applying to like parts. As in FIG. 5 the output of EO6 is in common to one input of N1 and O2, the output of the NAND gate N1 being as one input to a latch circuit consisting of NAND gates N4 and N5 which are cross-coupled. The second input to NAND gate N4 is a conductor 20 from a "restart" voltage and the output of N4 is coupled in parallel to the CEP inputs of BC1 and BC2, as a second input to NAND gate N2, and in parallel to the PE inputs of the shift register SR1 through SR$n$. As in FIG. 5 the parallel entry inputs P0, P1, P2, and P3 for the shift registers are coupled to initialization inputs. By this structural configuration a cycle counter is produced which, when started, runs through one complete period and then stops until restarted. The latch formed by N4 and N5 causes BC1,BC2 to stop counting or accepting data in parallel, while the shift register is enabled to accomplish parallel data from the initialization inputs. Therefore, some starting point is loaded into the shift register continuously until the latch is reset and normal operation can be resumed.

In the above embodiments illustrated in FIGS. 3 through 6 considerable interconnection wiring, multi-input gates, and extenders are eliminated as shown by the prior art in FIGS. 1 and 2. Synchronization signals and self-starting capability are achieved simply in the FIGS. 3 through 6 embodiments of this invention. The invention works with either linear sequence generators or ring counters. A number of interconnection options allows the construction of a universal divider capable of dividing by any number between $n$ and $2^n$ either in the continuous or cycle counter mode of operation as shown and described for the above figures.

While many modifications may be made to provide various shift register numbers $n$, to provide modifications of sequence generators and ring counters for division between $n$ and $2^n$ without departing from the spirit of this invention, I desire to be limited only by the scope of the appended claims.

I claim:

1. A control logic circuit for linear sequence generators and ring counters comprising:

- a shift register having a clock pulse input, a signal input, parallel entry inputs, a pulse enable input, and outputs;
- a feedback circuit through a plurality of exclusive-OR gates arranged in modulo-2 configuration from a preselected number of shift register outputs coupled to said shift register signal input to conduct only "1" states therethrough;
- a binary counter having a count enable parallel input, a count enable terminal input adapted to be coupled to a binary "1," a clock pulse input, a pulse enable input, parallel entry inputs, and an output coupled to said shift register signal input;
- a clock pulse source coupled to said clock pulse inputs of said shift register and said binary counter; and
- gate circuits in said coupling between said exclusive-OR gates and said shift register signal input and between said binary counter and said shift register signal input whereby consecutive binary "0" inputs to said shift register until a single binary "1" appears through said exclusive-OR gates back to said shift register signal input and a count output of a binary "1" from said binary counter will prevent latch-up of said shift register in the binary "0" state.

2. A control logic circuit as set forth in claim 1 wherein said gate circuits in said coupling between said exclusive-OR gate and said shift register signal input includes an OR-gate having the output of said exclusive-OR gate as one of its inputs and said output of said binary counter as a second input thereto, the output of said OR-gate constituting said signal input to said shift register and coupled to said binary counter pulse enable input.

3. A control logic circuit as set forth in claim 2 wherein said coupling between said OR-gate and said binary counter pulse enable input includes an inverter.

4. A control logic circuit as set forth in claim 1 wherein said gate circuits in said coupling between said exclusive-OR gate and said shift register signal input includes an OR-gate and NAND gates having outputs coupling the pulse enable inputs of said shift register and said binary counter to enable and disable same.

5. A control logic circuit as set forth in claim 4 wherein said NAND gates are two in number, one of which are one input coupled to the output of said exclusive-OR gate and a second input coupled to said output of said binary counter and the second NAND gate having one input coupled to the output of said one NAND gate and another input coupled to the output of said OR-gate, said OR-gate coupling the output of said binary counter to the signal input of said shift register.

6. A control logic circuit as set forth in claim 5 wherein said parallel entry inputs of said binary counter are adapted to be coupled to programming voltages and said parallel entry inputs of said shift register are coupled to a fixed potential.

7. A control logic circuit as set forth in claim 1 wherein said gate circuits in said coupling between said exclusive-OR gate and said shift register includes an OR-gate and two NAND gates, said OR-gate having one input coupled to the output of said binary counter, a second input coupled to the output of said exclusive-OR gate, and an output coupled to the signal input of said shift register, one NAND gate having one input coupled to the output of said exclusive-OR gate, a second input coupled to the output of said binary counter, and the output thereof coupled to the pulse enable inputs of said shift register, and the other NAND gate having two inputs coupled in common to the output of said OR-gate and the output thereof coupled to the pulse enable inputs of said binary counter.

8. A control logic circuit as set forth in claim 1 wherein said gate circuits in said coupling between said exclusive-OR gates and said binary counter to said shift register signal input includes an OR-gate, two NAND gates, and a gate latch, said output of said binary counter being through one input of said OR-gate to said shift register signal input, the other input to said OR-gate being from said exclusive-OR gate in common through one of said two NAND gates to said gate latch, the output of said gate latch being in common to said count enable parallel inputs of said binary counter, to said parallel enable inputs of said shift register, and to one input of the other of said two NAND gates, the second input to said other of said two NAND gates coupled to the output of said OR-gate, and the output of said other of said two NAND gates being coupled to said pulse enable inputs of said binary counter to latch up counting by said binary counter and shift register until a restart signal is applied to said gate latch.

9. A control logic circuit as set forth in claim 8 wherein said gate latch comprises a pair of cross-coupled NAND gates having a restarting input to one and having said output of one of said two NAND gates to the other of said pair.

* * * * *